INVENTOR.
WILLIAM R. WOODWARD

INVENTOR.
WILLIAM R. WOODWARD
BY
ATTORNEY

INVENTOR.
WILLIAM R. WOODWARD
BY
ATTORNEY

United States Patent Office 2,840,808
Patented June 24, 1958

2,840,808

MOVING TARGET INDICATION SYSTEMS

William R. Woodward, Manhasset, N. Y., assignor, by mesne assignments, to the United States of America as represented by the Secretary of the Navy Application March 19, 1946, Serial No. 655,437

7 Claims. (Cl. 343—7.7)

This invention relates to a radar moving target indication system, and more particularly to a system so adapted that there are no target speeds within wide limits which are incapable of detection. The latter undetectable speeds are a common form of hinderance to nearly all conventional moving target indication systems and are known in the art as "blind" velocities.

In brief, radar echoes of objects moving toward or away from the radar station are distinguishable from those of stationary objects since the R. F. phase of electromagnetic energy returning from the former changes from pulse to pulse, while the phase of energy from the latter remains constant. To make evident changes in R. F. phase, the incoming radar echo signals are beat against a stable reference oscillation which is locked in fixed phase relation with the R. F. oscillations making up the output radar pulse. The beat signal formed by a moving object echo fluctuates in amplitude at a frequency determined by the R. F. wave length employed and the so-called radial velocity at which the object is moving toward or away from the radar system. The beat signal of a stationary object remains constant in amplitude.

Moving and stationary objects are then distinguished from one another by retaining or storing the beat signal wave of one output pulse and comparing it with the beat wave of the next subsequent pulse. Where differences occur in the two waves, a moving object is known to exist and can be made evident on conventional radar indicators. A supersonic delay line for signal delay or a storage system employing an electrostatic beam deflection storage tube comprise the conventional methods for delaying the echo signal for purposes of comparison.

A failing of the moving target indicator (MTI) system just described is that it is not capable of detecting phase changes of whole cycles from objects which move toward or away from the radar station a distance equal to an integral number of half wave lengths of the R. F. output energy during a single pulse interval. A series of so-called "blind" velocities which are integral multiples of one another are the result. The present invention contemplates the elimination of such "blind" spots in the velocity spectrum by changing the radar pulse interval at a rate so rapid that a moving object cannot possibly alter its speed at a corresponding rate and remain undetected.

An object of the present invention is to provide a radar system capable of distinguishing moving objects from stationary ones.

Another object of the present invention is to provide a radar moving target indication system having no "blind" velocities and thus capable of detecting objects moving toward or away from the radar station with any radial velocity substantially between zero and some comparatively high predetermined value.

A further object is to provide a moving target indication system with no "blind" velocities which can employ either a supersonic delay line or an electronic storage tube moving target selector.

Another object is to provide a radar system operating at a multiplicity of predetermined pulse repetition rates in a predetermined sequence.

These and further objects are made apparent in the following specification which is accompanied by several drawings of which:

Figure 1:
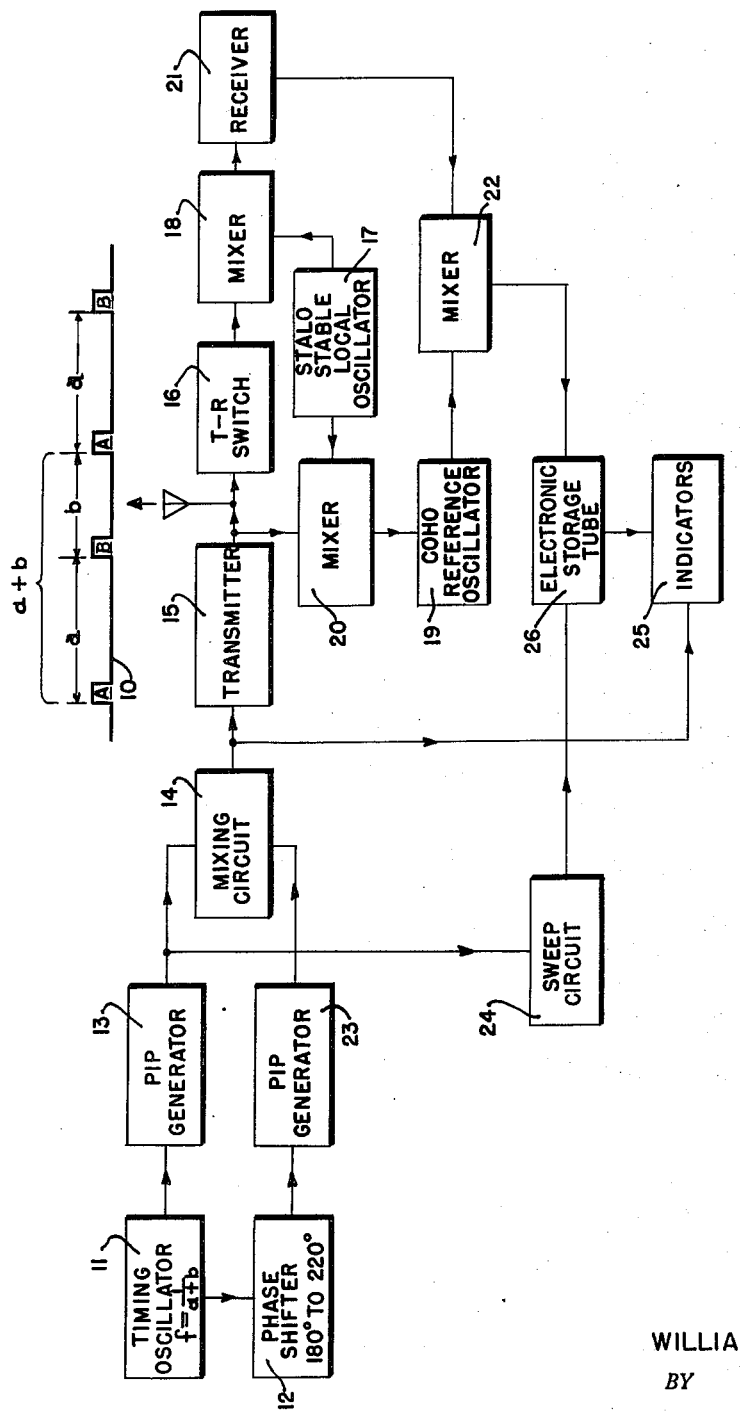
Figs. 1 and 2 are block diagrams of two forms of the present invention.

Referring now specifically to Fig. 1, a moving target indication system is shown which employs two different pulse spacing intervals, $a$ and $b$, in alternation, as the antenna R. F. output envelope 10 illustrates. It will be immediately realized that no moving radar target can change its motion so quickly as to traverse an integral number of R. F. half wave lengths during both of the rapidly interchanged intervals $a$ and $b$.

Any number of timing devices may be employed to produce properly spaced triggers for such a wave form. The one illustrated herein comprises a stable sine wave timing oscillator 11 having an output frequency $$\frac{1}{a+b}$$

a phase shifter 12 for altering the phase of the sine wave of oscillator 11, two conventional pip generators 13 and 23 which produce a sharp trigger for each cycle of their respective sine waves, and a mixing circuit 14 for combining the two pip waves just prior to their triggering the transmitter 15. It can be seen that to produce the output envelope 10, phase shifter 12 must be adjusted to shift the sine wave of oscillator 11 by an angle $$\phi = \left(\frac{a}{a+b}\right) 360° \text{ or } \phi \left(\frac{b}{a+b}\right) 360°$$

The circuit components which act on the incoming radar echo are well known in the art. The echo first passes through the transmit-receive (T–R) switch 16 and is heterodyned to a lower intermediate frequency level by the output of the stable local oscillator (commonly known as Stalo) 17 in the mixer 18.

At the time of the main R. F. output pulse, a timing reference or coherent oscillator (commonly known as Coho) 19 operating at approximately I. F. level is locked in a fixed phase with the transmitter oscillations by a portion of the signal thereof fed through mixer 20 which also receives the sine wave of Stalo 17.

The I. F. output of the radar receiver 21 is beat against the sine wave output of Coho 19 in mixer 22. The resultant beat wave having moving object echoes of fluctuating amplitude and stationary object echoes of constant amplitude serves either to deflect or to intensity modulate the electron beam of an electronic storage tube 26, which is a form of Iconoscope, utilized to discriminate between signals of constant and varying amplitude.

In brief, the electron beam of storage tube 26 sweeps across a mosaic screen made up of microscopic conducting particles spattered on one surface of a dielectric sheet. On the other dielectric surface is a conductive coating which acts as the common collector plate for all the minute condensers formed on the dielectric. After sweeping the video beat wave for a number of times in a fixed pattern across the mosaic screen, equilibrium is reached between the incident electrons of the storage tube beam and the secondary electrons emitted by the mosaic particles over those portions of the sweep where the beat signal is constant. Where moving objects echo signals exist on the beat wave, no such charge equilibrium results and the net current entering or leaving the condenser collector plate is evidence of such motion.

The output triggers of either pip generator 13 or 23 are employed to actuate the sweep circuit 24 of storage tube 26. The two different pulse intervals $a$ and $b$ are thus accommodated by the storage tube moving target selector by the use of a single constant time duration sweep $a+b$ in length. Conventional radar indicators 25 are fed the moving object output signals of storage tube 26 and employ the triggers of mixing circuit 14 for sweep timing.

Figure 2:
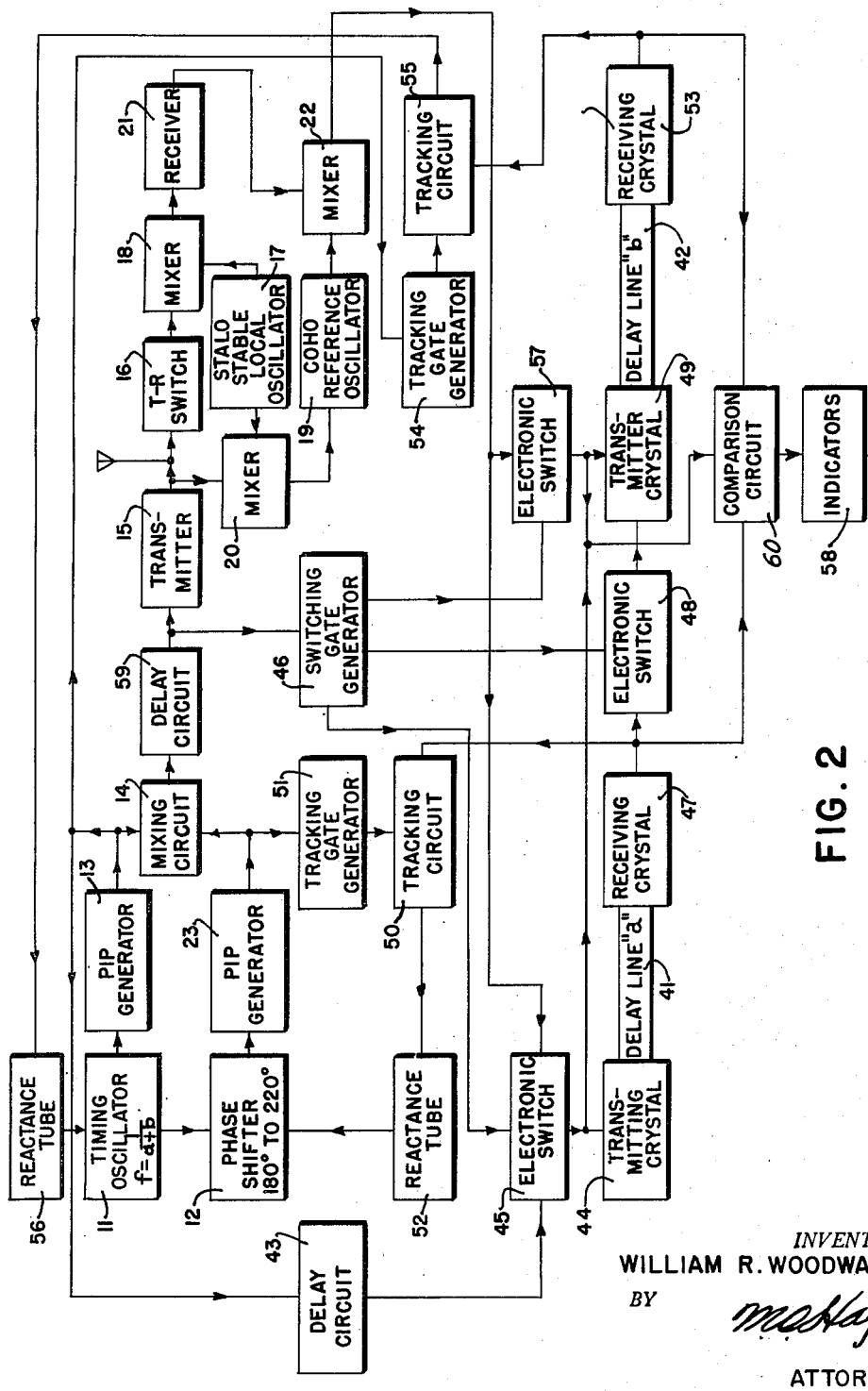
Figure 3:
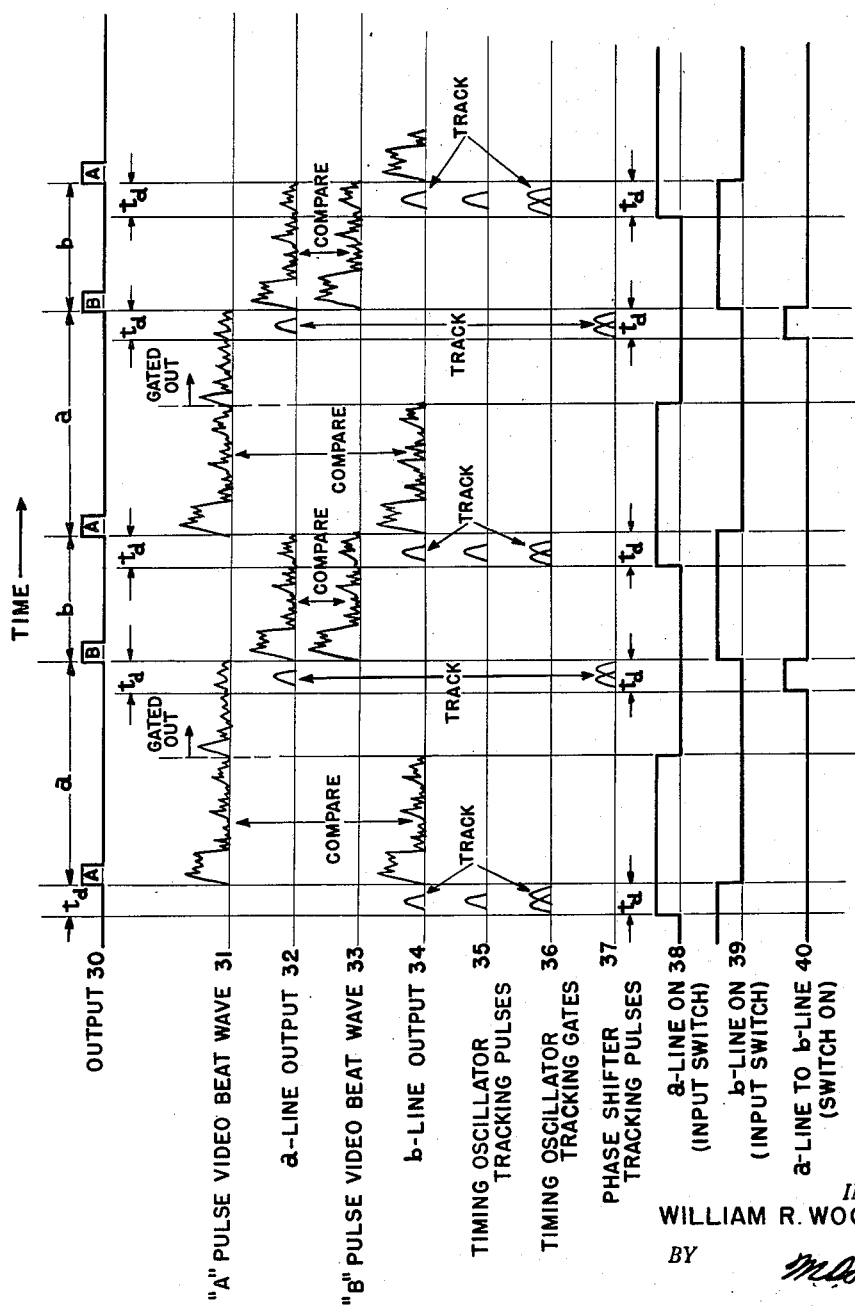
Fig. 3 is a timing diagram illustrating operation of the system of Fig. 2.

Another form of the present invention employing supersonic delay lines as moving target selectors instead of the storage tube 26 of Fig. 1 is shown in Fig. 2, and its operation is set forth in the timing diagram of Fig. 3. As in the apparatus of Fig. 1, blind velocities are herein eliminated by the use of two different pulse intervals $a$ and $b$ in alternation as shown in wave form 30 of Fig. 3.

The components of Fig. 2 numbering 11 through 23 are identical to those of Fig. 1 having corresponding numbers and perform like functions. Reference is made to the analysis of Fig. 1 for information concerning these units.

Two supersonic delay lines 41 and 42 of the general type in which the electrical signal is transformed by a piezoelectric crystal transducer to an acoustic wave which travels through a suitable medium before being reconverted back to an electrical signal. The times required for a compressional wave to travel from the transmitting to the receiving crystal through the medium in the two delay lines must be of $a$ and $b$ duration respectively.

The technique of synchronization will first be discussed. For convenience the main R. F. output pulse preceding the $a$ time interval is called the A pulse (see waveform 30 of Fig. 3) and that preceding the $b$ interval, the B pulse. The timing pips of generator 13 of Fig. 2 are delayed slightly in circuit 43 and enter the transmitting crystal 44 of delay line 41 through the electronic switch 45 which is held closed at the time of these pips by the gating wave 38 (Fig. 3) generated in the gate generator 46.

In a time $a$, timing pulses entering crystal 44 travel the length of delay line 41 to the receiving crystal 47. At this crystal, the timing pips go to a conventional radar range tracking circuit 50 and to the electronic switch 48. With this switch held closed by gate wave 40 (Fig. 3) formed in generator 46, the pip output of crystal 47 is directed to transmitting crystal 49 of delay line 42.

It is desired that the phase shifter 12 of Fig. 2 cause the pip generator 23 to produce triggers that follow those of generator 13 by a time interval $a$. To achieve this condition, range tracking gates are formed in generator 51 in time synchronism with the pips of unit 23 and these gates are shown in wave form 37 of Fig. 3. These tracking gates formed by two overlapping pulses are employed to keep a third pulse (the radar echo when such gates are used for ranging) centered symmetrically thereon.

One way in which such centering is achieved is to integrate the area by which the third pulse overlaps the left tracking gate and likewise integrate the overlap area of the third pulse and the right tracking gate. The two integrals are then subtracted from one another, and unsymmetrical alignment of the third pulse is indicated by a difference other than zero which is employed to provide the desired correction. It is obviously necessary that the cross-over point or center of the tracking gate occur at a small time interval after the left tracking gate is initiated by a pip from generator 13. To assure accurate synchronization, the delay circuit 43 retards pips from generator 13 by this small interval before they enter crystal 44.

Any of a variety of conventional radar circuits may be employed in the tracking unit 50 to indicate the time relation between the timing pips received by crystal 47 and the phase shifter tracking gates. The output of this circuit 50 controls a reactance tube 52 which readjusts the phase shifter 12 in such a way as to bring about the desired coincidence. The gates and pips which provide such phase shifter control are shown in waveforms 37 and 32 respectively of Fig. 3.

Referring now to the timing pips travelling down delay line 42, these pips arrive at the receiving crystal 53 at a time $a+b$, plus the small delay time of circuit 43, after their initiation in generator 13. The triggers of generator 13, in addition, serve to actuate the tracking gate generator 54, which is similar to the unit 51 at intervals separated by a time $a+b$. The timing pips of crystal 53 and the tracking gates of generator 54 are directed to a tracking circuit 55 which adjusts the frequency of oscillator 11 by reactance tube 56 so that a delayed tracking pip is aligned symmetrically with the next subsequent (undelayed) tracking gate. In this manner apparatus of Fig. 2 is properly synchronized and attention can now be directed to the manner in which the two delay lines 41 and 42 achieve moving target selection.

To form the output transmitter pulses spaced in the manner set forth in this invention and as shown in waveform 30 of Fig. 3, the timing triggers of pip generators 13 and 23 are combined in mixer 14 and are delayed by the circuit 59 a time $t_d$ indicated on Fig. 3. This interval just prior to the initiation of the main output pulses permits synchronism of the system prior to each output pulse.

The radar echoes at R. F. level from receiver 21 are beat against the reference sine wave of Coho oscillator 19 in mixer 22, the output of which goes to comparison circuit 60 through electronic switches 45 and 57. Switch 45 is gated closed by wave form 38 of Fig. 3 so as to convey a timing pulse from pip generator 13 and an A pulse beat wave from mixer 22 (waveform 31) to crystal 44 of delay line 41. This switch is gated open a time $b$ after the A pulse so that comparison after delay can be made properly with the next succeeding B pulse beat wave and without delay with the next preceding B pulse wave. The A pulse output of mixer 22 directed to comparison circuit 60 is compared, usually by direct subtraction, with the delayed B pulse output of $b$-line 42 (waveform 34).

At the time of a B output pulse (waveform 30), switch 57 is closed by gate 39 of Fig. 3, conveying the B pulse beat wave (wave 33 of Fig. 3) to crystal 49 of line 42 and to comparison circuit 60 where it is subtracted from the $a$-line output wave 32. The output of the comparison circuit 60 goes directly to conventional radar indicators 58 on which only the desired moving targets are presented.

In summary, apparatus of the present invention provides moving target indication with undesirable "blind" velocities eliminated by the use of a multiplicity of pulse repetition frequencies. The above specification describes two forms of apparatus employing only two pulse spacings used in alternation. It will be apparent to those skilled in the art that any number of combinations of pulse spacings may be employed. The apparatus employing the electronic storage tube moving target selector with an $(a+b)$ time base sweep offers a minimum of complexity.

The invention set forth in the foregoing specification need not be limited to the details shown which are illustrative of only one form the invention may take.

What is claimed is:

1. A radar moving target indication system comprising means for producing short high-power pulses of electromagnetic energy separated in time from one another by a first and a second interval in alternation, said first and second intervals being substantially different from one another, means for receiving incoming reflected radar echoes, means for beating said echoes with a fixed frequency continuous wave reference oscillation, a first supersonic delay line having a delay time equal to said first time interval, a second supersonic delay line having a delay time equal to said second time interval, means for controlling said first and second pulse spacing intervals, switching means for directing alternate echo beat waves to the inputs of said first and second delay lines, means responsive to the outputs of said first and second delay lines and the incoming echo beat waves, to obtain a difference signal, and an indicator responsive to said difference signal to show the presence of moving targets.

2. A radar moving target indication system comprising, means for producing short high power pulses of electromagnetic energy separated in time from one another by a first and second interval in alternation, said first and second intervals being substantially different from one another, means for receiving incoming reflected target echo pulses, a stable reference oscillator, means for beating said echo pulse signals with oscillations from said reference oscillator to provide a beat signal wave, means for retaining each successive beat signal wave for the time interval between successive radiated pulses, and means for comparing the retained beat signal wave with the next incoming beat signal wave, whereby the occurrence of differences indicates the presence of moving targets.

3. A radar moving target indication system comprising, means for producing short high power pulses of electromagnetic energy separated in time from one another by a first and second interval in alternation, said first and second intervals being substantially different from one another, means for receiving incoming reflected target echo pulses, a stable reference oscillator, means for beating said echo pulse signals with oscillations from said reference oscillator to provide a beat signal wave, an electrostatic storage tube adapted to store a signal pattern on a dielectric screen by the charging action of a scanning electron beam, means for applying each of said beat signal waves to said storage tube, and an indicator responsive to the charging current of said tube, whereby changes in the charge pattern of said storage tube indicate the presence of moving targets.

4. A radar moving target indication system comprising, means for transmitting short high power pulses of microwave energy, means for obtaining reference oscillations in phase coherence with said transmitted pulses, means for receiving echo pulses from stationary and moving objects, a mixer responsive to said reference oscillations and said echo pulses to obtain a resultant beat signal wave having moving object echo pulses of fluctuating amplitude and stationary object echo pulses of substantially constant amplitude, an electrostatic cathode ray storage tube adapted to store a signal pattern on an electron emissive storage mosaic by the charging action of a scanning beam, means to pulse said transmitter at first and second time intervals in alternation, means to deflect the beam of said storage tube in a first direction for a time interval substantially equal to the sum of said first and second time intervals, means to apply said beat signal wave to said storage tube to deflect the beam thereof in a second direction thereby to establish a pattern of charge across said mosaic, and means coupled to said mosaic to develop an output voltage in accordance with the charging current flowing to said mosaic in response to change in said pattern of charge resulting from variable amplitude echo signals from moving objects.

5. Apparatus as defined in claim 4 including a cathode ray indicator, said indicator including means to sweep said cathode ray in synchronism with the pulsing of said transmitter, and means applying said output voltage to deflect said cathode ray in a second direction to display the presence of moving objects on the screen thereof.

6. Apparatus as defined in claim 4 wherein said means to pulse said transmitter at first and second time intervals in alternation comprises, a stable sine wave timing oscillator, a phase shifter connected to said oscillator, a first trigger pulse generator responsive to the output of said timing oscillator to produce an output pulse for each input cycle, a second trigger pulse generator connected to said timing oscillator through said phase shifter and producing for each input cycle an output trigger pulse displaced in time with respect to the output pulse of said first trigger pulse generator by an amount determined by the phase displacement introduced by said phase shifter, and means to combine the outputs of said first and second trigger pulse generators to produce trigger pulses occurring at first and second time intervals in alternation.

7. Apparatus as defined in claim 6 including a cathode ray indicator, a time base sweep for said indicator initiated in response to the output pulses of said first and second trigger pulse generators alternately and means applying the output voltage of said storage tube to said indicator to display the presence of moving objects on the screen of said indicator.

References Cited in the file of this patent

UNITED STATES PATENTS

| | | |
|---|---|---|
| 2,403,562 | Smith | July 9, 1946 |
| 2,403,600 | Holmes | July 9, 1946 |
| 2,410,424 | Brown | Nov. 5, 1946 |
| 2,415,095 | Varian | Feb. 4, 1947 |
| 2,423,024 | Hershberger | June 24, 1947 |
| 2,437,173 | Rutherford | Mar. 2, 1948 |
| 2,452,598 | Page | Nov. 2, 1948 |
| 2,512,144 | Emslie | June 20, 1950 |
| 2,532,546 | Forbes | Dec. 5, 1950 |